United States Patent [19]

Zwiep et al.

[11] 4,082,856

[45] Apr. 4, 1978

[54] PROCESS AND APPARATUS FOR SHELLING EGGS

[75] Inventors: Theodore Carl Zwiep; Donn G. Newhouse, both of Grand Rapids; Jerry D. Craner, Jenison, all of Mich.

[73] Assignee: Country Queen Foods, Inc., Grand Rapids, Mich.

[21] Appl. No.: 661,737

[22] Filed: Feb. 26, 1976

[51] Int. Cl.[2] .......................... A23L 1/32; A23N 5/00
[52] U.S. Cl. .................................. 426/299; 426/300; 426/480; 99/570; 99/571
[58] Field of Search ............... 426/298, 299, 300, 614, 426/480, 479; 99/568, 571, 577, 570, 581, 582

[56] References Cited

U.S. PATENT DOCUMENTS

| 3,216,828 | 11/1965 | Koonz et al. | 426/299 |
| 3,859,907 | 1/1975 | Hatcher | 99/570 |

Primary Examiner—Raymond N. Jones
Assistant Examiner—R. A. Yoncoskie
Attorney, Agent or Firm—Miller, Morriss and Pappas

[57] ABSTRACT

Hard cooked eggs are fed through a hopper to a conveyor section which has an oscillating and vibratory feed at a frequency and energy level which progressively fractures and shatters the shell of the eggs passing therethrough. The eggs are passed through a resilient orifice which flagellates the eggs successively and frictionally dislodges the shell and the eggs are subjected to a stream of fluid such as water intersecting their path of travel differentially lubricating and assisting in the stripping of the shells from the eggs without damage to the hard cooked flesh of the eggs. The eggs are washed clean and the shell debris is collected and the shelled eggs are emitted in a separate flow path. Process fluid is treated as desired and recycled.

The apparatus comprises a collector hopper oriented above a conveyor run onto which eggs are delivered in a consecutive sequence path. The conveyor is agitated and vibrated imparting continuous shock loading to the eggs passing through the conveyor. As the eggs leave the conveyor they pass through an annulus subject to the vibratory action and the vibration causes the annulus to flagellate the eggs and the eggs are each subjected to a stripping action combined with a water jet which lubricates and assists in stripping the shells from the eggs. The eggs and debris are passed onto a reaction driven rotating cleaning table and a final cleansing spray of water is derived from the table drive and is directed at the moving eggs and all shell debris drops through the table and into a debris collecting and separating tank. The eggs are deflected from the table and collected separately from the debris. The process water may be filtered and reused.

13 Claims, 9 Drawing Figures

U.S. Patent    April 4, 1978    Sheet 1 of 4    4,082,856
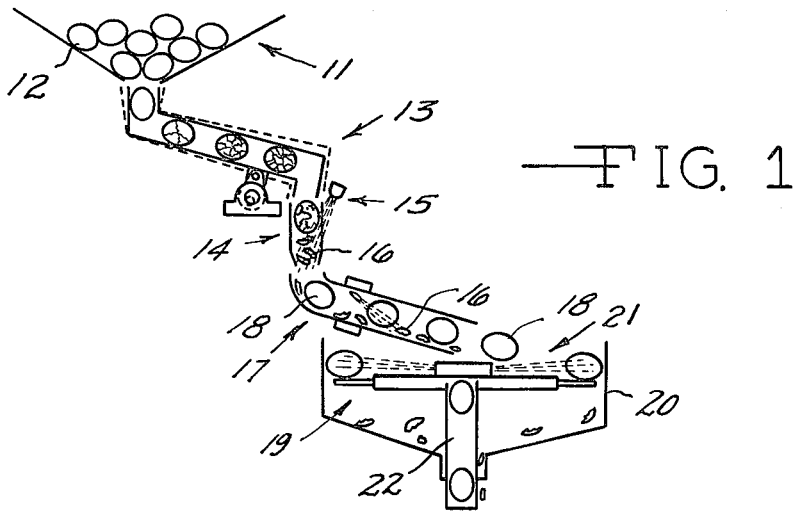
FIG. 1
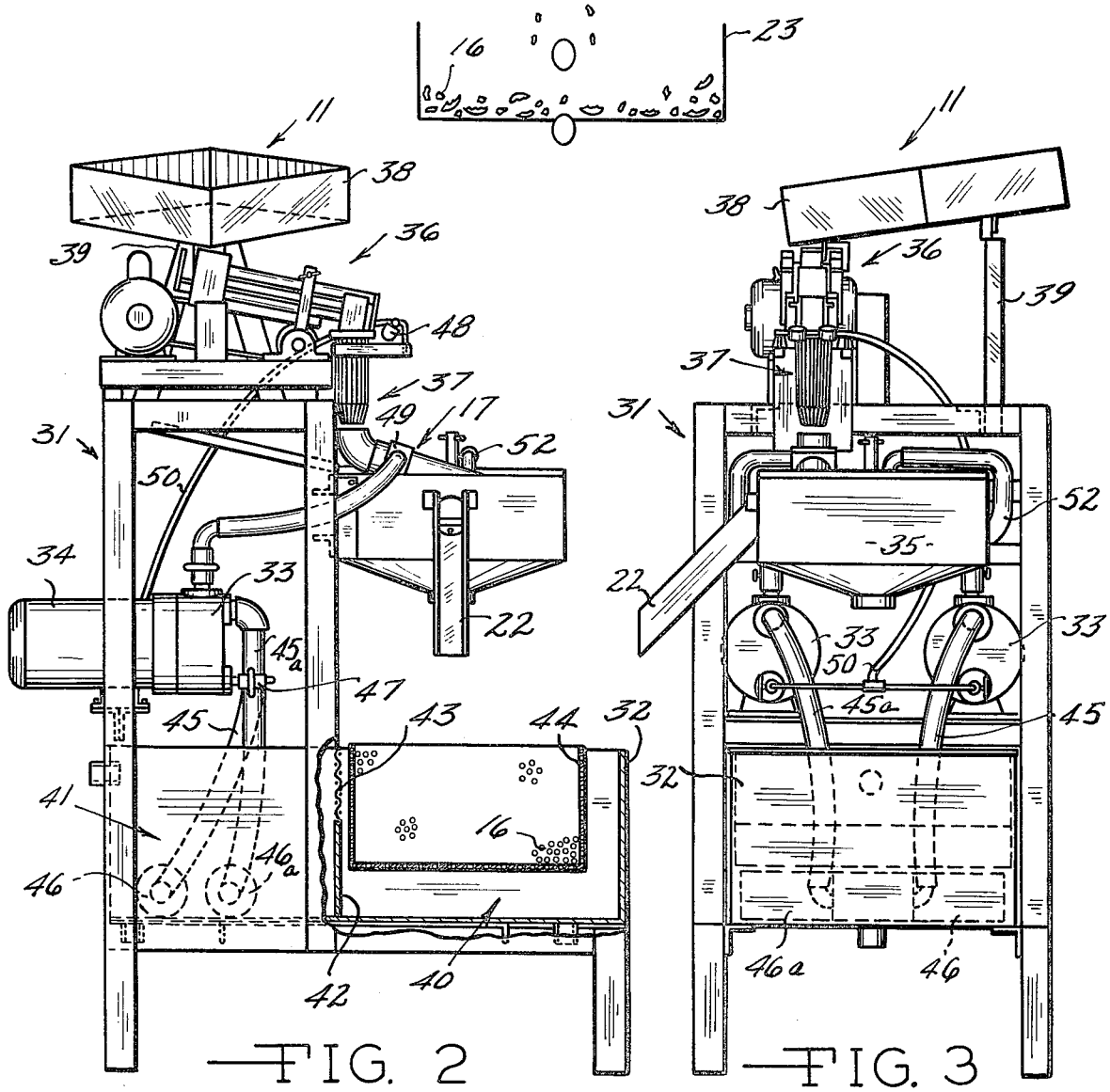
FIG. 2
FIG. 3

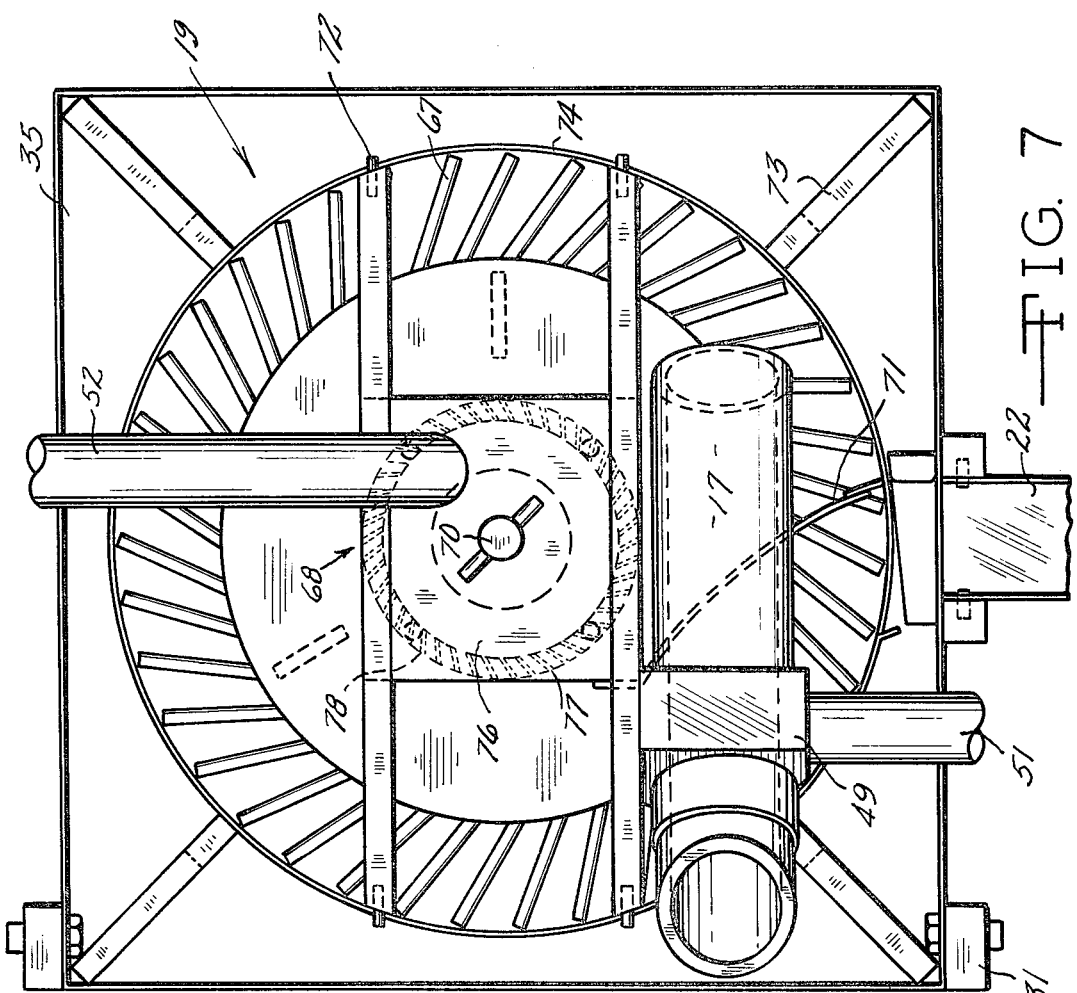
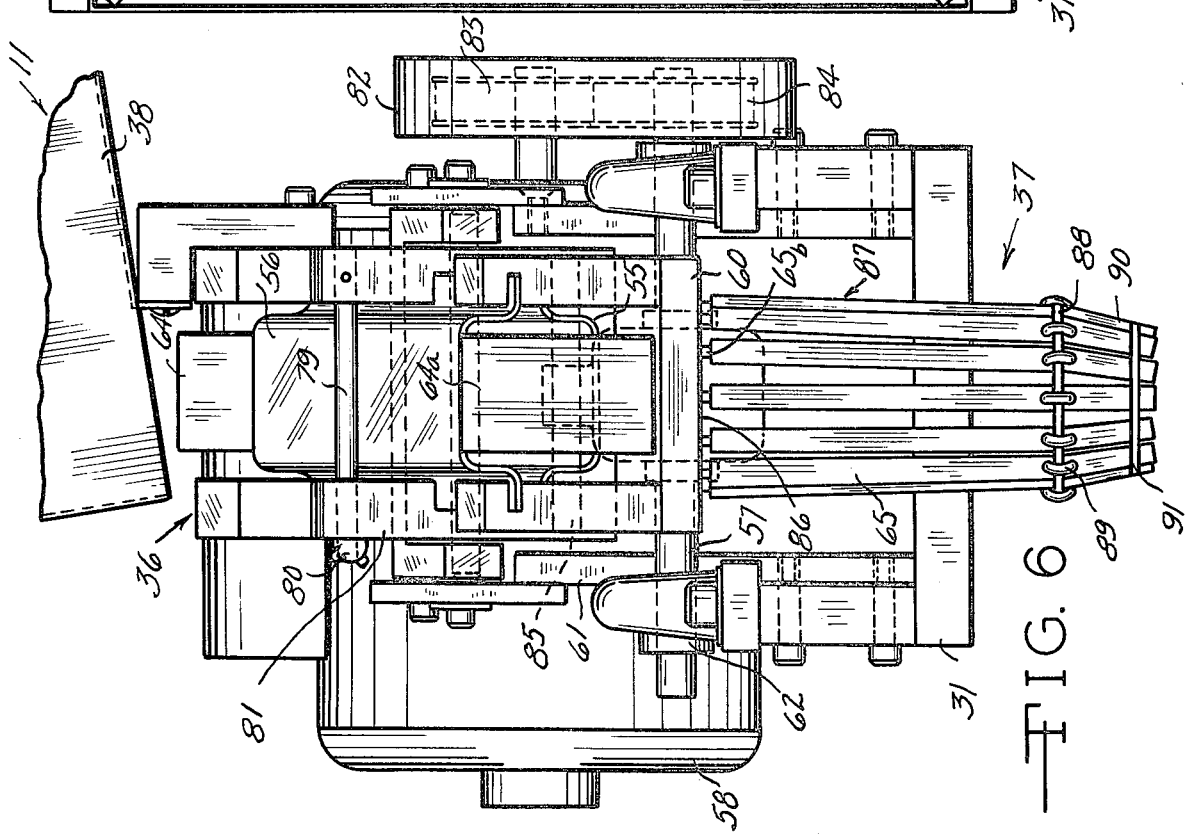

PROCESS AND APPARATUS FOR SHELLING EGGS

The present invention is directed to a process and apparatus for practicing the peeling of shells from hard cooked eggs. More particularly, the process and apparatus are intended to continuously operate on precooked eggs to shatter the egg shells in a very thorough progressive manner and then to pass the eggs through a resilient orifice applying circumferential flagellation and gripping of the egg with sufficient restraint as to frictionally disengage the major portion of the shell from the egg meat or flesh. As considered herein the membrane between shell and meat is a part of the shell separating from the meat with the shell. A fluid applied to the eggs acts as a differential lubricant so that the annulus frictionally strips the rough shell and harmlessly deforms the slippery egg meat.

The prior art is generally expressed in the following U.S. Pat. Nos. 3,216,828 to Koonz et al. using a water jet and rolling of the egg; 3,613,756 to Snyder et al. for pinpoint fracture and water jet force; 3,684,531 to Foster proposing a freeze phase prior to cracking and shelling by jet.

The prior art does not show or suggest a truly continuous process for the removal of shells from the hard cooked eggs since most processes involve a preorientation of the eggs on a lot basis, selected fracture as by a sharp object, and subsequent removal of the shell by subjecting the cracked egg to the influence of fluid jet. The prior art does not show or suggest the vibratory cracking of the egg while conveying it through a conveyor station and urging it inertially through an adjustable vibrating orifice. The prior art does not show the construction of a suitable flagellating orifice to achieve stripping of the shell in a gentle frictionally sliding motion under the influence of differential lubrication and with minimal chance for damage to the meat of the egg and self-adjustable to variations in egg size and presentation. The prior art does not show or suggest a machine to achieve these desirable consequences in which the eggs proceed through a moving cleaning table and the shell debris is collected for separate use and salvage. The prior art does not show or suggest shell removal apparatus in which the process fluid is reusable and is pumped to the jet stations and to the table drive stations after filtration. Finally the sequential continuousness of the process and the apparatus is not seen in the prior art and the specific apparatus allows the structure to be easily cleaned, maintained, and operated. It requires minimum human intervention in egg handling and thus substantially reduces the chances for contamination while increasing productivity.

The above objects are clearly achieved over the art as known to the applicants and other objects such as economy, rugged serviceability, and efficient operation will be readily perceived by those skilled in the art as the description proceeds.

IN THE DRAWINGS

FIG. 1 is a schematized profile view of the process as practiced in the present invention.

FIG. 2 is a side elevation view of an egg shell removal apparatus as embodied in the present invention.

FIG. 3 is a front elevation view of the structure seen in FIG. 2.

FIG. 6 is a front elevation view of the structure shown in FIG. 5 and best illustrating the resilient stripping orifice construction.

FIG. 7 is a top plan enlarged view of the cleaning table and is particularly useful in showing the reaction motor drive of the table and simultaneous final cleaning of shell debris from egg.

GENERAL DESCRIPTION

Figure 5:
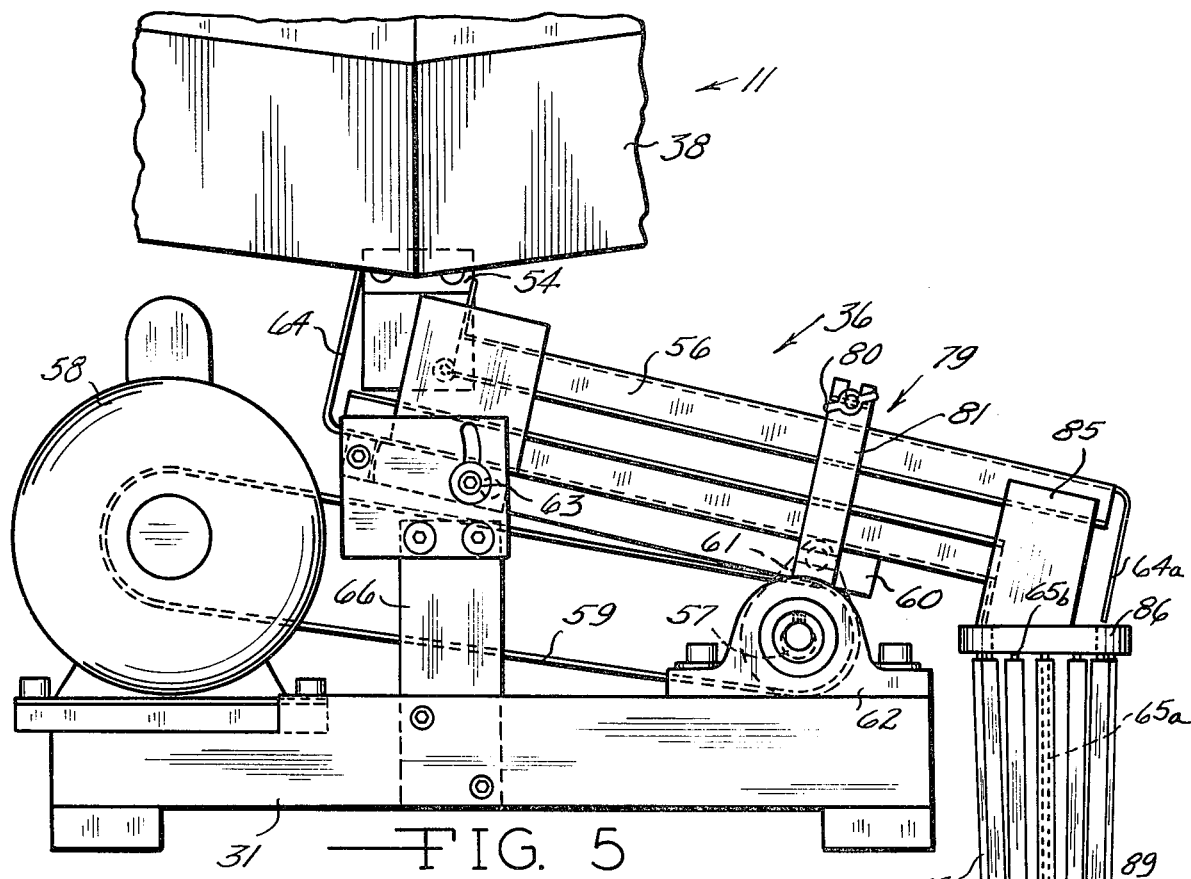
FIG. 5 is an enlarged side elevation view of the hopper-conveyor-orifice structure and best illustrating the vibratory apparatus influencing feed, cracking, and delivery through the plural fingered resilient flagellating orifice.

In general, the present invention is directed to a continuous process for shelling hard cooked eggs and apparatus for practicing the process. The process includes providing a continuous consecutive feed of hard cooked eggs; passing the eggs through a vibratory conveyor station where the eggs are subjected to progressive and thorough shell shattering shock; moving the eggs from the vibrating conveyor via gravity and drive from the conveyor through a resilient orifice influenced by the vibration whereby the shell and shell membrane is frictionally and gently stripped from the meat of the egg; augmenting the stripping by means of a liquid jet which lubricates and dislodges by force the interphase between shell and meat of the egg; transferring the shell debris and eggs through a delivery tube and augmenting the flow of the eggs and debris by liquid jets and delivering eggs and debris onto a rotating stage or table; subjecting the shelled eggs to a final liquid spray while the shell debris falls through the table and into a collection tank; and consecutively delivering eggs from the table. In the process, the liquid used for the jets is water adjusted to desirable pH with additives such as to establish process demanded salinity. The process is very amenable to the addition of chlorination where such procedures may be sought. The shells and shell debris is trapped, as on a screen. The water is filtered and recirculated in the process as desired and the process is extremely saving of water over prior known continuous washing operations. The egg shells may be recovered or discarded and are found to have an increasing value as a source of lime, for example, in gardening operations and in feed additives.

The apparatus is basically a storage hopper supported at the top of a suitable machine frame and connected to an enclosed vibrating conveyor path in which the conveyor is inclined downwardly and is vibrated as by suitable oscillating or eccentric machinery. At the lower end of the vibrating conveyor, and connected thereto so as to vibrate therewith, is a resilient orifice formed by a plurality of soft surfaced depending fingers which may be articulated by elastic or resilient bands which bias the fingers in the form of an annulus toward closing but allow expansion of the orifice against the selected bias to adjust over a wide range of egg sizes and profiles. In the simplest form the fingers depend in the form of a cylinder and the fingers under the influence of vibration flagellate the eggs circumferentially as they inertially move through the resilient annulus. The eggs, thoroughly and progressively cracked by their progress through the vibrator conveyor are moved through the resilient flagellating orifice by gravity and by the energy of the oscillation generated in the vibratory conveyor section. The same vibratory motion activates the flagellation. The eggs consecutively proceed through the shelling station and drop into an inclined tubular chute. The flow of eggs and debris through the closed chute is augmented by a ring of fluid jets directed complementarily of the flow path of the eggs. This achieves a further stripping of the shells and assures a lubricity between shell and egg meat conductive to simple removal of shell debris. The tubular chute successively dumps the eggs onto a moving stage, platform or horizontal table having table having an openwork or wire surface so that the shell debris passes easily through the table and the eggs rest thereon until rotated by movement of the table to a removal chute where the eggs are consecutively directed through the ramp or chute opening and via the ramp to a point of collection storage or subsequent processing. The table or stage is driven by a reaction motor operable at the hub of the table and the liquid spray from peripheral orifices impinges on the egg and table surfaces imparting motion to the table journalled on the hub and finally removing all shell debris from the eggs as they move toward ejection. The journalling is preferably a low friction fluid thrust bearing in which the liquid of the process under pressure is self-cleaning of the bearing interphase and prevents entrainment of debris. A collector hopper located beneath the table and beneath the water jets in the apparatus receives all of the process water and shell debris. The water and shell debris are dropped from the collector hopper into a shell separating section or screen basket. The screen basket is positioned in a tank and the larger shell debris is retained in the basket while the water passes into the tank along with fine shell debris. The fines settle to the bottom of the tank. The water in the tank rises to a point of passing over a screened weir and drops into a pump reservoir or sump. In the reservoir is a filter cartridge connected to the pump intake. In addition, as desired, a separate pick-up is available for a water treating or chlorinator circuit which is entrained at the additive entry of the pump. Above the reservoir, the pump is connected to the intake tube and delivers filtered and treated process water to the points of jet supply and to the reaction motor. The motor for the pump is drivably connected to the pump and is also supported by the machine frame. The vibratory conveyor is pivotally supported at one end (upper) and oscillatingly supported at the other (lower) end. Provisions are made in the structure for suitable journalling of moving parts and the vibrating apparatus is secured to the upper platform of the machine frame. An oscillator such as a vibratory drive motor drivably connected to the eccentric of the oscillator element drives the conveyor, annulus and hopper, as desired.

Clean-out drains are provided in all of the tanks and reservoirs and the vibratory conveyor is easily opened for cleaning and the table is easily dismantled for cleaning and flushing. All surfaces touching or handling the eggs are accessible for thorough inspection and cleaning in accord with accepted food handling standards.

In operation, the described process and apparatus is easily placed on stream and requires little attention beyond removal of debris and egg product, change of filters and occasional cleaning of tanks and application of additives (such as chlorine) as required. Since the energy level is low for progressive cracking and shattering of the egg shells in the conveyor, the machine is subjected to low stress so that major points of wear are in the oscillator motor and the pump motor and pump. The table is powered by water jets and the filtered fluid such as water provides an excellent lubricating media in operation. The machine requires very little service over long operating periods and is considered to outproduce batch processes formerly common in the egg shelling fields. As an indication of the effectiveness of these procedures and assuming a supply of hard cooked eggs, time studies indicate a through put of 2250 eggs per man hour as against the best previously known procedures with a through put of 270 eggs per man hour. The process and apparatus provides an easy reclamation procedure for the shells and can operate on minimum water supply. Where process water at adequate pressure is unlimited, the pump can be eliminated or supplementally used where process water is below the pressure level desired in the jets. From the adjustment point of view in the vibratory conveyor, oscillation frequency speed and amplitude may be varies as desired. Similarly the incline of the conveyor section is adjustable. The circumferential compression on the eggs, where desired, passing through the resilient orifice is adjustable by providing a resilient bias urging the plural fingers of the stripper toward closure with the egg. The jet pressures, as has been mentioned, can be varied below a value to damage the meat of the egg and at a value which implements removal of debris and provides lubricity to the meat surface. The jets in the reaction motor should have an energy value to suitably move a complete tray of shelled eggs in the journalled path to egg removal. Additives to the process water are easily bled into the process water at the pump or in the reservoir. Pump turbulence and cavitation results in ideal intermixture of chlorine or other material in the water without process interruption. Continuous production flow is achieved with this process and apparatus with attendant appreciated economies. Plural installations are possible and double feed conveyors are operable provided the flow rates of eggs through the flagellating orifice is not choked.

SPECIFIC DESCRIPTION

Referring to the drawings and most specifically, first, to the FIG. 1 thereof, the process for shelling hard cooked eggs is best comprehended in a schematic presentation. The process is continuous and presents a consecutive sequence of eggs as shown. From a feed hopper station 11 the previously hard cooked eggs 12 are successively fed into a vibrating conveyor station 13 which is slightly inclined so that the eggs 12 move through the conveyor section 13 by gravity and by force vectors imparted by the continuous agitation or vibration. The eggs 12 are progressively cracked and the shattered shells are thus loosened by the impact of egg against egg and by egg against the conveyor structure itself. The eggs 12 are successively emitted from the vibrating conveyor 13 and are dropped into and through a vibrating orifice station 14 defined by an annulus of grouped rubber or rubber-like elongate fingers subjected to the vibratory action and biased toward closure against the surface of the eggs 12 by the consequent circumferential flagellation or as by resilient bands. The passage of the eggs 12 successively through the orifice station 14 is augmented by a fluid jet or spray 15 which impinges on the eggs 12 passing through the orifice 14 and which differentially lubricates the shell and exposed meat of the eggs 12 so that the annulus or orifice 14 utilizes the resilient and flagellating bias to selectively strip away the relatively high friction shell 16 including membrane of the eggs 12 while allowing the slippery egg meat 18 to be squeezed through the orifice 14 and the egg meats 18 pass successively into the tubular scrubbing station 17 which is a conveyor in which fluid jets assist the whole egg meats 18 in movement and further assists and freeing shell particles 16 from the egg meat 18. Thus shelled, the eggs 12, now intact meat 18, is dropped onto a rotating platform stage or table 19. The table or stage 19 has an openwork wire or grill surface so that liquid and shell debris 16 pass through the table 19 for collection by the hopper 20 and separation. A spray 21 coming from the axis of the table 19 and radially and tangentially disposed therefrom strikes the egg meat 18 and moving stage 19 in a final cleaning action and reaction drives the table 19 around the axis thereof in the manner of a reaction motor as the fluid impinges on the intact egg meat 18 and moving stage 19. The meats 18 or egg 12 (less shells) are deflected from the circular table path and into gathering chute 22 for further handling or processing. The separator trap or basket 23 gathers and separates the shell debris 16 from the process fluid such as water and the water or fluid may thereupon be recycled for use in the several jet stations and the table drive. As will be seen, the process fluid passes into a tank from the basket 23, fine particles are dropped out in the tank and the fluid rises over a screened weir and is filtered via replaceable filter cartridges before being recycled by suitable pumping means. Additives may be entrained to the recycled process fluid such as water. The products of the process are continuously shelled whole hard cooked eggs and washed shells.

One form of apparatus preferred for practicing the above described process is best appreciated by reference to the FIGS. 2–9 and in FIGS. 2 and 3 the full elevation views designate the machine frame 31 which comprises a skeletal structure of suitable structural sections as to support the tank 32, the pump 33 and pump motor 34, the collector hopper or pan 35 and the vibratory conveyor section 36 and depending orifice structure 37. A feed hopper 38 is supported on the frame 31 by the struts 39. The frame 31 may be welded or otherwise fastened together as by rivets, bolts, and with suitable reinforcement such as gussets and the like as needed. The materials of construction for the frame 31 is preferably stainless steel and this applies to those parts likely to encounter the eggs 12 or whole egg meats 18. Resin capable of sustaining heats of steam cleaning and cleaning solvents are acceptable in certain mechanical applications as substitutes for the stainless steel and the annulus or orifice section 37 is preferably rubber or rubber-like or latex coated. Details of construction will be better appreciated as the description proceeds.

The tank 32 is separated into a collector section 40 and a sump section 41 by a weir plate 42 and screen 43. A fine mesh wire basket 44 is supported in the collector section 40 of tank 32. The basket 44 receives process fluid and shell debris 16. The fluid passes through the basket 44, into the collector section 32, over the weir 42 and screen 43 and into the sump 41. Pump intakes 45 and 45a extend into the sump 41 and are terminally connected to filter cartridges 46 and 46a in the sump 41 and to the pump or pumps 33. An additive inlet fitting at 47 allows the entrainment of chlorine, salt or pH adjusting compounds as required. Where two pumps 33 are used, as illustrated, one of these pumps 33 serves the reaction motor located in the collection hopper 35 and the other pump 33 serves the jet ring 49 in the tubular conveyor 17. The lubricating jets 48 are served also by the pumps 33 via the conduit 50. The conduit 51 is connected between the pump 33 and the jet ring 49. The conduit 52 runs upwardly to connection with the spray block of the reaction motor structure located in the collector hopper 35.

A single pump 33 with plural delivering provisions could be satisfactorily used. Since high pressure fluid is not required, fresh water at line pressure can be employed and the pumps 33 are then unnecessary. Such an arrangement is useable where water is plentiful.

Figure 4:
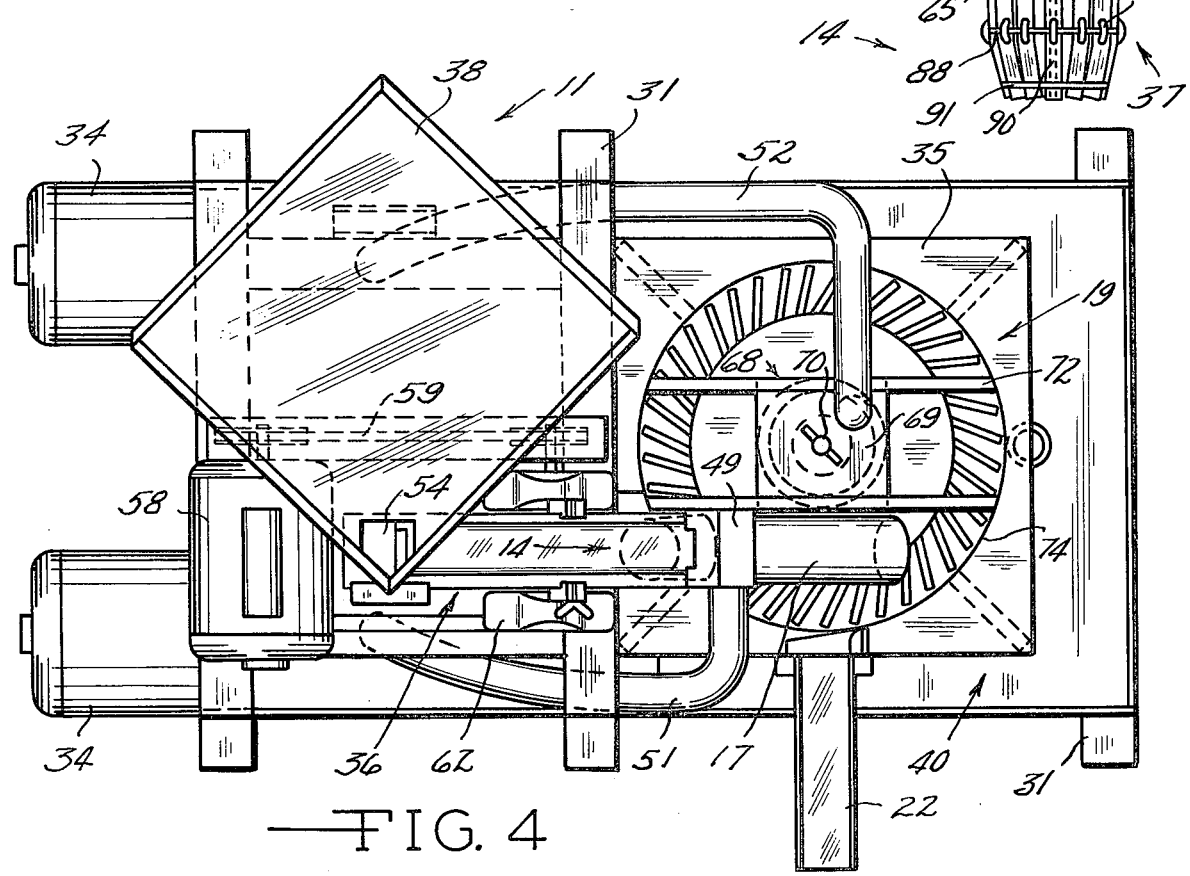
FIG. 4 is a top plan view of the structure seen in FIG. 2 and enlarged to indicate the construction of the hopper, vibrating conveyor, resilient orifice, cleaning table and debris tank and egg delivery chute.

In FIG. 5 the vibrating conveyor 36 is best understood and the FIG. 4 best assists in visualizing the relationship of the feed hopper 38 secured to the machine frame 31 and suspended with its gate 54 registrably above the entry to the inclined conveyor track 55 and cover 56. As desired, the hopper 38 is also subjected to oscillation or vibration. The track 55 and cover 56 define the pathway along which the eggs 12 proceed under the influence of vibrations imparted as by rotation of the eccentric 57 driven by the motor 58 via the belt or chain 59. The eccentric 57 is coupled operably to a base member 60 by means of a connecting arm 61 and the eccentric runs in the bearing 62 secured to the machine frame 21. The upper end of the vibrating conveyor 36 is pivotally connected at the journal 63 forming a fulcrum for the oscillations imparted when the eccentric 57 is driven. The position of the journal point 63 is variable as indicated. Amplitude and frequency are accordingly adjustable. The conveyor 36 includes end baffles 64 (upper) and 64a (lower) which direct the flow of eggs 12 and prevent their chance escape in movement from the hopper 38 into the conveyor 36 and from the conveyor 36 into the orifice 14 defined by the resilient annulus 37 made up of the plural fingers 65. Under the vibratory influence the fingers serve as flagellum which gently and resiliently thrash against the flow of eggs. The motor 58 is secured to the machine frame 31 and a stanchion portion 66 of the machine frame 31 supports the journal or pivot 63 and upper end of the conveyor 36. As the peeled eggs 18 leave the orifice 14 they enter the tubular conveyor 17 and pass therethrough urged by the jet ring 49 toward delivery onto the openwork table or platform 19 in the collector hopper 35. The stage or table 19 is circular and includes plural slots 67 in support of eggs 18 deposited thereon from the tubular conveyor 17. The vertical axis of the table comprises a hub structure 68 fixedly supported by the hopper 35 and the fluid supply tube or conduit 52 supplies drive fluid to the reaction motor 69 which, as will be seen, is a part of the hub structure 68. The thumb screw 70 allows the journalling of the table 19 to be disassembled and provides cleaning access to the reaction motor 69. Debris from shell removal passes through the platform 19 and into the collector hopper 35. Eggs are removed from the table 19 via the chute 22 by deflecting means not shown in the FIG. 4 which interrupts the rotating path of the whole egg meat 18 and gathers them successively into the path of the chute 22. The baffle 71 is visible by reference to the FIG. 7. The superstructure 72 supports the hub structure 68 and is further structurally stabilized by the struts 73 which also support the cylindrical track shield 74 which defines the fixed outer perimeter of the path formed by the table 19. In FIG. 7 the reaction motor 69 in the hub 68 of the table 19 is also best understood since the fluid conduit 52 is connected through the block 75 to an annular opening or passage 76 connecting through the circular wall 77 of the motor 69 by plural orifices or jets 78 somewhat tangentially and uniformly radially oriented so as to drive fluid toward the eggs 18 and the structure of the table 19 and thence to move the table 19 while washing the eggs 18 free of any shell debris 16. The egg meats 18 are urged by the stream outwardly and rotatingly and may be confined by a cylindrical shield having an opening therethrough and through which opening the egg meats 18 travel. Hence, the table 19 moves counterclockwise as shown in FIGS. 4 and 7 as influenced by the spray from jets 78.

In FIG. 6 the structure shown in FIG. 5 is supplemented and by reference to both FIGS. 5 and 6 the top clamp 79 with thumb screws 80 acting on the strap 81 indicates the cleaning ease of removal of the cover 56 from the vibrating conveyor 36. The belt guard 82 supporting the drive sheave 83 of the motor 58 and the driven sheave 84 for the shaft of the eccentric 57 is best appreciated. The cheek plates 85 are connected to the vibrating conveyor and provides a connection to the ring frame support 86 for the annulus assembly 37 which depends from the frame support 86. Thus, the vibrating conveyor 36 imparts its vibrations to the annulus assembly 37. The elongate fingers 65 are tubular and depend from the support ring 86 and are arranged in a cylindrical manner forming a chute portion 87 with relatively large clearance and a transition ring restraint 88 made from a ring attached perimetrically to lugs 89, thereby restricting outward expansion of the tubular vertical chute 37. Each of the tubular fingers 65 supports a wire core piece 65a and actual attachment to the support ring 86 is achieved by securing the upper end 65b of the wire core pieces to the ring in a spaced apart depending circumferential manner, as shown. The core pieces 65a extend the length of the fingers 65 except as the tips are otherwise occupied. The lugs 89 are stainless steel eyes and their lower extremities extend downwardly in the tubular fingers 65 rigidifying the depending fingers at the tips 90 but each finger tip 90 is free to pivot on the restraining ring 88. A resilient band 91 urges the finger tips 90 inwardly and radially forming a resilient annulus of fingers defining an orifice 14 therethrough of a dimension slightly smaller than the minimum dimension of an egg cross section. Thus, as an egg with a cracked shell is urged through the resilient annulus formed by the plural fingers 65 and the band 91 under the influence of a liquid such as water, the latex or rubber-like surface of the fingers 65 strips and grips the shell and stops the shell from the slick egg meat with minimum trauma to the egg meat. The relative difference in lubricity between shell and meat at the engagement with the soft rubber finger surfaces achieves a very complete shell removal assisted by the liquid spray and the flow of eggs in consecutive manner through the annulus is implemented by vibrations and oscillation imparted to the vibrating conveyor 36 and to the orifice section 37. As previously described, the shelled eggs 18 and the shell debris are washed down the tubular scrubbing section 17 to deposit on the rotating table 19. In operation, the vibratory action is felt by the ring 86 and is transmitted via the core pieces 65a into the fingers 65 which jiggle and thrash around the parade of eggs 12. This creates a flagellating condition as the fingers 65 flail at the cracked and moving shells. This action strips the shell and attached membrane from the eggs 12 in a continuous manner. Excellent results have been obtained by eliminating the rings 88 and 91 and the lugs 89 since under kinetic conditions the flagellation establishes its own restraints in conformance to the surfaces of the moving column of eggs.

Figure 8:
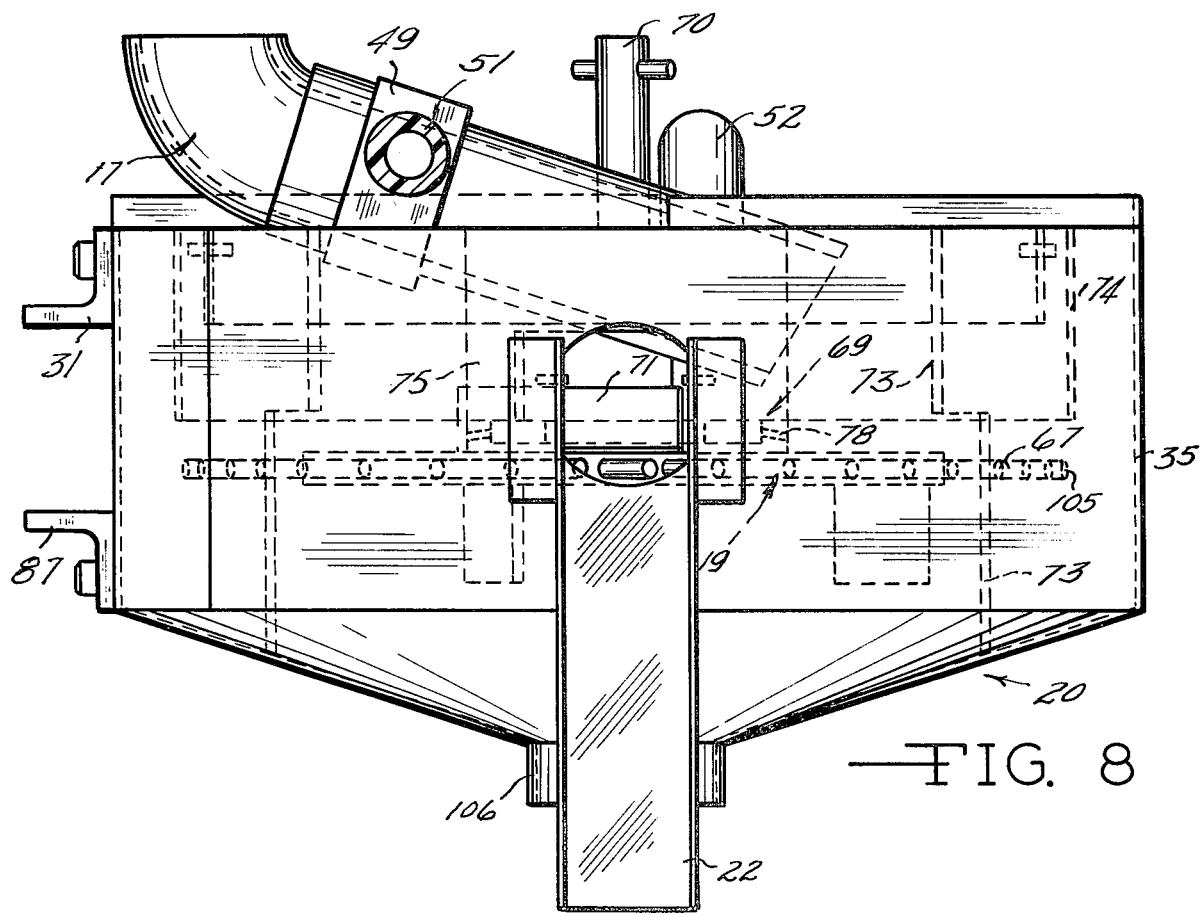
FIG. 8 is an enlarged side elevation of the table as seen in FIG. 7 and illustrative of the construction simplicity of the table.
Figure 9:
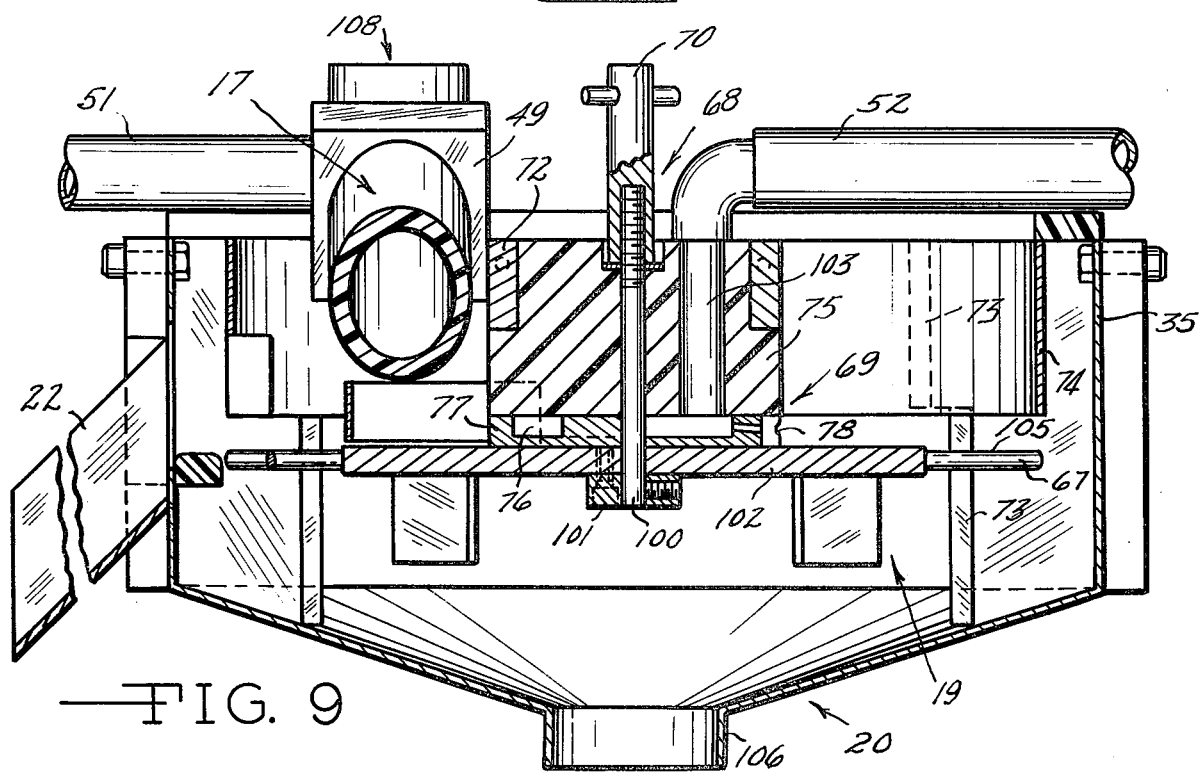
FIG. 9 is a full section view taken through the drive shaft of the table and indicating the fluid feed to the reactor motor.

The FIGS. 8 and 9 are best express the construction of table 19 rotating about the hub 68 in accord with the fluid lubricated reaction motor 69 which is a static plate secured against the block 75 by the axial rod 100 having a flanged support plate 101 secured to the lower end and being tensioned by the thumb screw or bolt 70 acting on the block 75 and in support of the table web 102 as shown. This securely clamps the motor plate 77 to the block 75 in alignment of the annular passage 76 with the entry passage 103 from the fluid delivering conduit 52 and the fluid such as water is sprayed radially and spirally outward through the ports 78. When eggs are on the table 19, delivered there by the tubular conveyor, the table is thus turned, the eggs are washed through about a full circle by the spray and are scraped off of the table 19 by the baffle 71 visible in FIGS. 7 and 8. The cylindrical skirt 74 limits the outward movement of the egg meats and is ported to emit the eggs at the baffle 71. This moves the eggs consecutively onto the chute 22 for collection. They are fully washed, cleansed of shell and subjected from shelling at the annulus station 14, to lubrication by the fluid spray.

The annular block 49 surrounding and penetrating the tubular conveyor 17 provides an annular spray complementing the movement of eggs and debris through the conveyor 17 and onto the table 19. The annulus 49 is connected to the fluid conduit 51. The grate-like elements 105 which comprise the openwork table surface on which the eggs travel allow the debris to fall through the table and into the collection hopper chute 20 and through the port 106 into the tank 32. As seen in FIG. 8, the angles secured to the hopper 35 provide the means for attachment to the machine frame 31 as seen in FIG. 2 so that the entry 108 to the inclined tubular conveyor 17 is in receiving registry beneath the resilient annulus or orifice section 37.

The simplicity of cleaning the described apparatus will be appreciated since removal of the threaded element thumb screw 70 drops the motor 69 and table 19 from the hub block 75 for scrubbing and steam cleaning as required. This provides cleaning access to all surfaces exposed to the egg meat and shell debris. The tanks areas 32 and 41 are provided with sump drains as shown so that periodic cleaning and flushing is facilitated. As previously described, the rail surfaces of the vibrating conveyor 13 are made accessible by simply removing the conveyor cover 56 as best understood in the FIG. 5. The latex or soft rubber covers of the tubular finger 65 are removable from the core pieces 65a in facilitating cleaning.

The vibratory conveyor section 13 in cooperation with the connected resilient flagellating orifice station 14 progresses eggs through the apparatus at an amazing rate and with minimal damage to the egg meat. The liquid sprays optimize performance and do an excellent job of finish cleaning of shell fragments at pressures well below those that might damage egg meat. In some prior art procedures where a water jet was relied upon to burst and strip the shell, the pressure values occasionally damaged the meat in achieving the removal of shell and shell membrane. By collecting the shells an important lime source by-product is made available reasonably free from egg contamination and salable for feed and garden nutrient supplement usages. Multiple units may be placed on stream as described herein to multiply production as desired. Treatment and rejuvenation of the fluid used in the process is simply accomplished and the apparatus is easily cleaned and the process easily adjusted to accommodate a variety of processes for production of hard cooked eggs. Similarly the present process is easily connected to additional food processing procedures and apparatus. The production rate possible by the present process and apparatus materially advances the art. The amount of fluid required is reduced by recycling and the quality of the end product is made more uniform Other advantages, adaptations and improvements will be appreciated by those skilled in the art as they comprehend the process and apparatus disclosed herein and such adaptations, advantages and improvements are intended to be included in the spirit of the present invention limited only by the hereinafter appended claims.

We claim:

1. A process for continuosly shelling hard cooked eggs comprising:
   vibrating hard cooked eggs to shatter the shells thereof;
   under vibration and gravity moving said shell shattered eggs along a continuous path;
   flagellating said eggs in a cylindrical resilient orificial passage while said eggs are moving whereby said shells are stripped from said eggs.

2. A process for continuously shelling hard cooked eggs comprising the steps of progressively subjecting a succession of eggs to continuous vibratory shock through a conveyor path and passing said eggs through a resilient and vibrating orifice whereby an annulus defining said orifice flagellates said eggs at the interphase between shell and annulus thereby dislodging the shell from the meat of said egg and passing the meat of said egg through said orifice.

3. The process of claim 2 wherein said eggs are wetted at said orifice and are subjected to a fluid jet spray augmenting the stripping action at said orifice and differentially lubricating the shell and meat facilitating passage of the meat of said egg through said orifice.

4. A process for continuously shelling hard cooked eggs comprising the steps of:
   presenting a continuous succession of hard cooked eggs to a progressive cracking of the shell under vibration in an inclined plane;
   flagellating said eggs in successive continuity through a resilient annulus while subjecting said eggs to a jet stream of fluid;
   gravity conveying said eggs onto a final wash station;
   subjecting said eggs to a final spray wash, said spray moving said eggs through a prearranged path;
   separating said shells from said eggs; and
   recycling fluid for reuse.

5. In the process as set forth in claim 4 wherein selected additives are entrained in said recycled fluid.

6. An apparatus for continuously shelling hard cooked eggs comprising:
   a machine frame;
   a hopper mounted on said frame and positioned to successively and continuously discharge hard cooked eggs;
   an inclined vibrating conveyor secured to said frame to receive successively at its upper end said eggs from said hopper and discharge said eggs at its lower end with shells thereof thoroughly cracked; and
   a resilient annulus below the discharge end of said vibrating conveyor to effectively close on and successively flagellate each of said eggs and frictionally separate said shells from the meat of said eggs.

7. In the apparatus of claim 6 wherein a fluid jet mounted on said frame intersects the path of said eggs in a direction complementary to the flow of said eggs and differently lubricates egg meat and shell and assists in stripping said shell from said meat of said eggs.

8. In the apparatus of claim 7 wherein an inclined tubular conveyor beneath said annulus receives and transports said eggs and a fluid jet augments movement of eggs and shell debris through said tubular conveyor.

9. An apparatus in accord with claim 8 wherein said tubular conveyor discharges onto a frame supported movable openwork stage and said stage is operably moved by a reaction motor entraining a fluid jet stream against said eggs;
   a deflector plate in the path of said eggs on said moving stage to gently and successively urge said eggs to removal and collection; and
   a chute positioned on said frame to receive and direct said eggs as they are deflected by said deflector plate.

10. In the apparatus of claim 9 wherein a collector is secured to said frame and located beneath and in support of said stage and receives all fluid and debris from said apparatus;
    a tank beneath said collector having a shell separating section and a sump section; and
    a fluid pump mounted on said frame having an intake in said sump section of said tank and an outlet connected by conduit supplying fluid to said fluid jets.

11. In the apparatus of claim 10 wherein said pump is provided with an additive entry and restorable filter means are provided shielding said intake.

12. An apparatus for continuously and successively shelling hard cooked eggs comprising:
    a machine frame;
    a feed hopper attached to said frame;
    a vibrating conveyor section connected to said frame and beneath the discharge of said feed hopper;
    an orifice defined by a resilient annulus of rubber-like consistency and through which eggs successively and frictionally passed, said annulus comprising a plurality of cylindrically oriented depending fingers operably connected to said vibrating conveyor section to circumferentially flagellate said eggs successively;
    a fluid jet mounted on said frame and directed to impinge on the pathway of said eggs through said orifice;
    a fixed tubular conveyor secured to said frame having an entry in register beneath said orifice and a lower outlet;
    a fluid ring jet on said tubular conveyor and directed to provide a ring stream within said tubular conveyor complementing the flow direction of said eggs;

a collector hopper beneath said tubular conveyor and connected to said frame;

a movable openwork table in said hopper and presenting a horizontal and circumferential path for said eggs as they are fed thereon by said tubular conveyor;

a reaction motor comprising fixed and partially tangentially oriented jets at the hub of said table and directed to impinge fluid against said eggs and table and thence to move said table; an egg directing chute secured to said frame in the path of said eggs;

a separator tank section beneath said collector hopper;

means in said tank to separate and clarify said fluid; and a fluid pump operably connected to said tank and supported by said frame with an outlet discharging to said fluid jets in said apparatus.

13. In the apparatus of claim 12 wherein said pump includes an additive inlet whereby fluid regenerative material may be entrained in the recycled fluid.

* * * * *

UNITED STATES PATENT OFFICE
CERTIFICATE OF CORRECTION

Patent No. 4,082,856  Dated April 4, 1978

Inventor(s) Theodore C. Zwiep et al.

It is certified that error appears in the above-identified patent and that said Letters Patent are hereby corrected as shown below:

Column 1, line 32, insert "a" after "of"

Column 3, line 6, "vibrator" should read --- vibratory ---

Column 3, line 19, delete "having table" after "table"

Column 4, line 27, "varies" should read --- varied ---

Column 5, line 15, change "and freeing" to read --- in freeing ---

Column 6, line 34, change "21" to read --- 31 ---

Column 7, line 46, after "65" insert --- thereby ---

Column 8, line 11, after "Figs. 8 and 9" delete --- are ---

Column 9, line 18, after "uniform" insert --- . ---

Column 9, line 27, "continuosly" should read --- continuously ---

Column 10, line 53, after "eggs" insert --- are ---

Signed and Sealed this

Fifteenth Day of August 1978

[SEAL]

*Attest:*

RUTH C. MASON
*Attesting Officer*

DONALD W. BANNER
*Commissioner of Patents and Trademarks*